United States Patent [19]
Hanks

[11] 3,762,517
[45] Oct. 2, 1973

[54] INTERNAL EXPANDING FLUID OPERATED CLUTCH FOR FANS

[75] Inventor: James V. Hanks, Minneapolis, Minn.

[73] Assignee: Horton Manufacturing Company Inc., Minneapolis, Minn.

[22] Filed: Apr. 3, 1972

[21] Appl. No.: 240,663

[52] U.S. Cl. ............................ 192/85 AB, 416/169
[51] Int. Cl. ............................................. F16d 25/00
[58] Field of Search ..................... 192/85 AB, 82 T, 192/70, 113 A; 416/169

[56] References Cited
UNITED STATES PATENTS

| | | | |
|---|---|---|---|
| 2,840,316 | 6/1958 | Herbenar | 192/82 T |
| 3,092,228 | 6/1963 | Deykin | 192/85 AB |
| 3,185,257 | 5/1965 | Caero | 192/70 X |
| 2,386,478 | 10/1945 | Kraft | 192/70 X |
| 2,637,308 | 5/1953 | Dodge | 192/82 T |
| 3,099,166 | 7/1963 | Schou | 192/87.17 |

Primary Examiner—Benjamin W. Wyche
Attorney—Wicks & Nemer

[57] ABSTRACT

An internal caliper fluid operated clutch including a hub having a sheave mounted rotatably on the hub and opposed members forming friction surfaces connected to the sheave together with a dual cylinder having a first cylinder and a second cylinder with single means mounting the pistons in the cylinders with means mounting the dual cylinder member between the opposed friction surfaces of the opposed members and means mounting the mounting means for the dual cylinder rotatably on the hub together with a fan on the mounting means and means for supplying fluid pressure at a point between the first and second pistons to move the same into contact with the opposed friction surfaces of the opposed members whereby the fan mount rotates with the sheave.

5 Claims, 2 Drawing Figures

INTERNAL EXPANDING FLUID OPERATED CLUTCH FOR FANS

SUMMARY OF THE INVENTION

The invention relates to an improvement in clutches and more particularly to an internal caliper fluid actuated clutch.

The clutch provides a pair of pistons mounted in opposed cylinders connected by a joining member.

The clutch provides a pair of spaced opposed friction surface members connected by a joining member with a pair of pistons mounted in opposed cylinders between the opposed friction surface members for engagement of the opposed surfaces by the pistons. With such construction no thrust bearing is required to absorb the reaction of the pistons, and with the pair of opposed annular and axially separated pistons for a given diameter one obtains twice the torque force as in a single pressure plate clutch.

The opposed friction surface members are each equipped with cooling fins and the joining member for the same is equipped with cooling fins thus providing fin cooling in an amount not possible with conventional known clutches.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment(s) of the inventive idea wherein like numerals refer to like parts throughout.

In the drawing forming part of this application:

Figure 1:
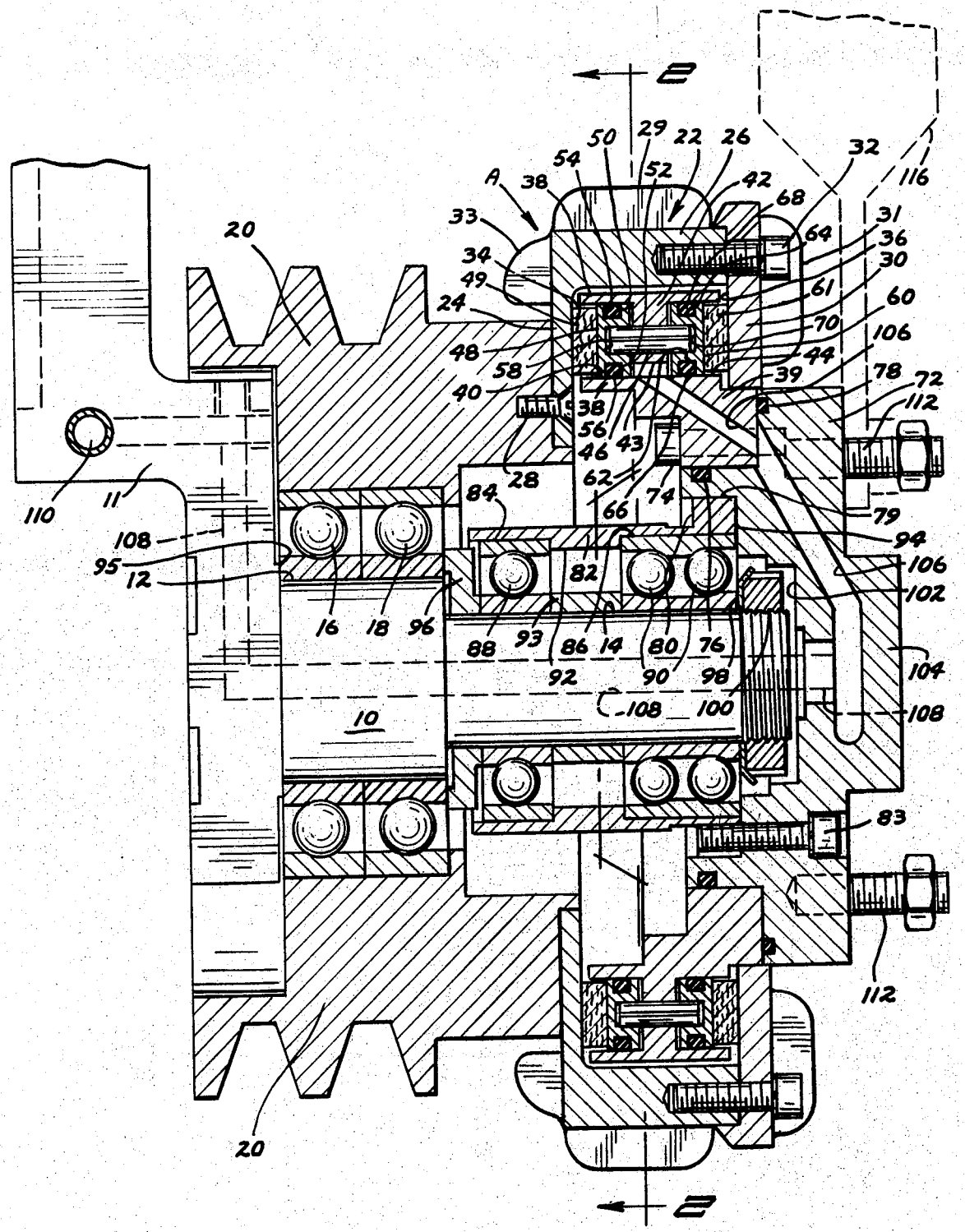
FIG. 1 is a longitudinal axial sectional view through a clutch embodying the invention.
Figure 2:
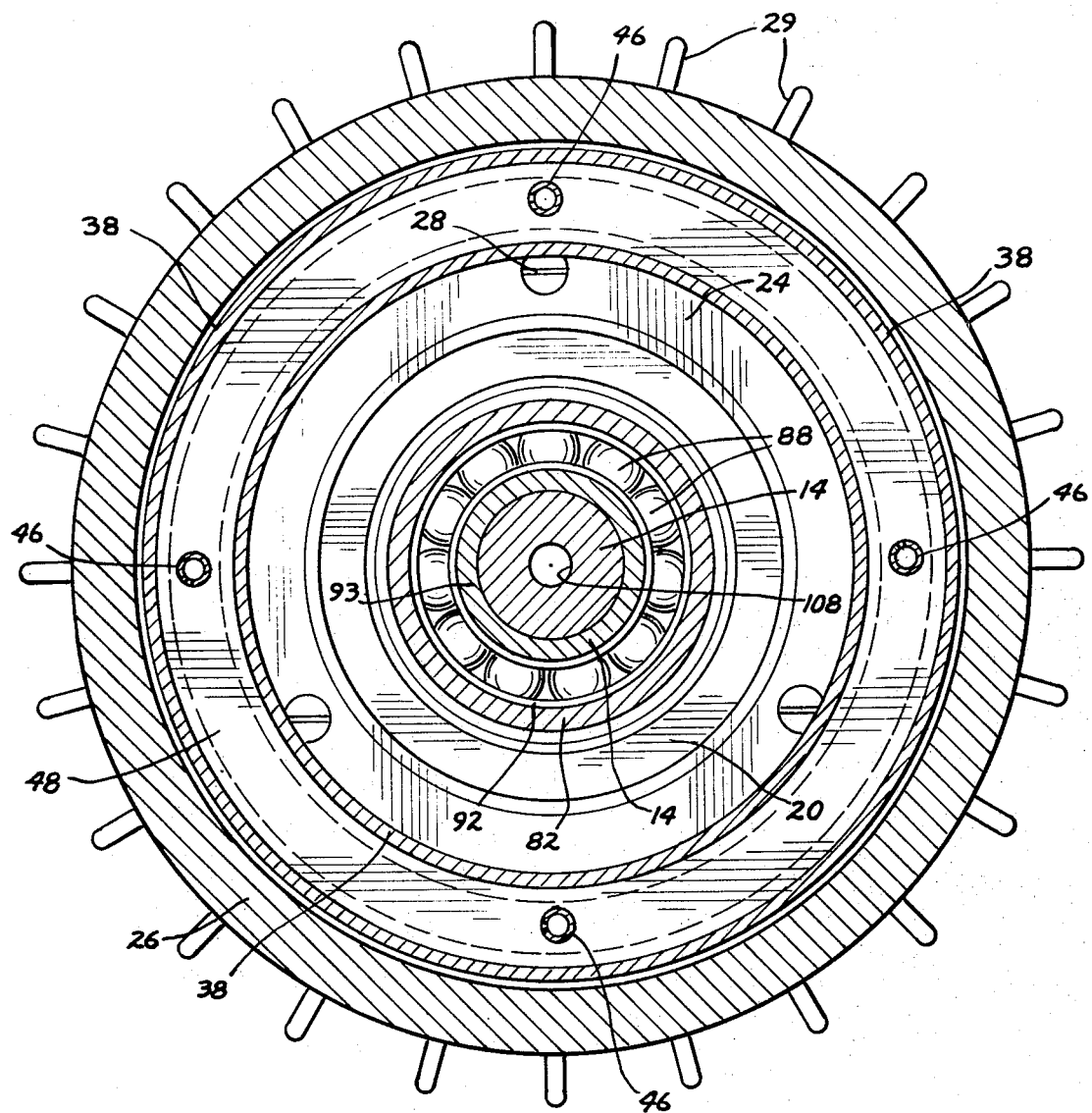
FIG. 2 is a sectional view on the line 2—2 of FIG. 1.

Referring to the drawings in detail, the internal caliper clutch A includes the stationary hub 10 formed with the enlarged portion 12 and the reduced portion 14 and on which is mounted the bearings 16 and 18 and on which the live sheave 20 is rotatably mounted. The hub is formed integrally with the bracket 11. Further provided is the annular mount 22 formed of the radially disposed flat ring base portion 24 and the right angular which are joined by the annular flange portion 26. The mount 22 is secured to the sheave 20 by means of a multiplicity of spaced bolts 28. Cooling ribs or fins 29 are formed on the portion 26.

The numeral 30 designates the radially disposed flange which is bolted to the annular flange 26 by means of a multiplicity of bolts 32. The flange 30 is provided with cooling fins 31, and the ring base portion 24 is formed with the cooling fins 33. The inner surface of ring 24 and the inner surface of flange 30 are parallelly disposed and form opposed friction surfaces 34 and 36. Further provided is the annular dual cylinder 38 formed of the first annular cylinder 40, annular central wall 42, and the second annular cylinder 44. A portion of the central wall 42 is short of the inner surface of the cylinder as at 43 to form an inlet to allow entrance of fluid pressure into both cylinders of the dual cylinder. The single and common inlet 43 communicates with cylinders 40 and 44. Securely mounted in the central wall 42 are a multiplicity of spaced hardened spring pins 46. Also provided is the first piston 48 which is mounted in the first annular cylinder 40 and the piston is formed with inner and outer annular grooves 50 and 52, respectively, in which are positioned the O-rings 54 and 56, respectively, which make sealing contact with first cylinder 40. The first piston 48 is formed with a multiplicity of sockets 58 in which the pins 46 are slidably positioned.

The numeral 60 designates a second piston which is mounted in the second cylinder 44 and which is formed with the inner and outer annular grooves 62 and 64, respectively. Positioned in the grooves 62 and 64 are the O-rings 66 and 68, respectively. The second piston 60 is formed with a multiplicity of sockets 70 in which the pins 46 are slidably positioned. The piston 48 has secured thereto the friction facing 49, and the piston 60 has secured thereto the friction facing 61.

The cylinder 38 is formed with the annular offset extension 39 which is securely mounted on the rotatable annular fan mount 72 by means of the bolts 74 with sealing engagement provided by the O-rings 76 and 78 positioned in recesses in the mount 72. The mount 72 is rotatably mounted by means of the recess 79 formed in the mount and in which is received the annular flange 80 formed on the end of the sleeve 82. The fan mount 72 is secured to the flange 80 by means of a multiplicity of bolts 83. The sleeve 82 has formed in the inner surface thereof the annular recesses 84 and 86. A bearing 88 is provided, and the outer race thereof is press fit in the recess 84 of the sleeve 82 with the inner race mounted on the reduced portion 14 of the stationary hub 10. A further bearing 90 is provided with the outer race thereof press fit in the recess 86 of the sleeve 82 and the inner race mounted on the reduced portion 14 of the stationary hub 10. The bearings 88 and 90 are spaced by the annular raised portion 92 of the sleeve 82. The outer race of the bearing 90 abuts the shoulder 94 of the mount 72 formed by the recess 79, and the inner race of the bearing 88 abuts the ring 96 on the hub 10 which in turn abuts the inner race of the bearing 18. The inner race of the bearing 90 abuts the lock ring 98 which is keyed to the hub portion 14 and adjacent the lock nut 100 threadedly secured to the outer end of the hub portion 14. The fan mount 72 is formed with the cavity 102 into which the end of the hub portion 14 and lock nut extend. The fan mount 72 is also formed with the extension portion 104. The inner race of the bearing 16 abuts the bracket 11 integrally formed with the hub 10. As the lock nut 100 is drawn up on the threads of the hub portion 14 the lock ring 98, the inner ring of bearing 90, the bearing spacer 93, the inner ring of bearing 88, the ring 96, the inner rings of bearings 16 and 18 all exert a force against the shoulder 95 of the bracket 11.

The numeral 106 designates a fluid passageway leading from inlet 43 of the dual cylinder 38 from the cylinder body 38 thence through the fan mount 72. The passageway 106 connects with the fluid passageway 108 formed in the extension 104, the hub 10 and the bracket 11 to the fluid inlet 110. The fan mount 72 has mounted thereon a multiplicity of the stud bolts 112 on which is mounted the fan blades 116 partially shown in broken lines.

It will be seen that with the operation of the pistons 48 and 60 that rotation of the fan mount 72 is accomplished through the rotation of the sheave 20 as hereinafter described.

OPERATION

The clutch A is operated as follows. Fluid pressure is introduced by conventional methods into the inlet 110 through the passageway 108 to the passageway 106 to the dual cylinders 40 and 44. As a result the friction facing 49 of first piston 48 and friction facing 61 of the second piston 60 are moved into engagement with the opposed surfaces 34 and 36. As a result the fan mount 72 and fan thereon is caused to rotate with the live and rotating sheave 20. It will be seen that with the construction shown herein that no thrust bearings are needed to absorb air chamber or piston reactions in the dual cylinder 38.

It will also be seen that with the ring base 24, the annular flange 26 and the radial flange 30 each may carry the cooling fins described and thereby provide cooling unattainable in known single pressure plate clutches.

I claim:

1. An internal caliper fluid operated clutch comprising:
   a. a hub,
   b. a sheave mounted rotatably on said hub,
   c. opposed members forming friction surfaces connected to said sheave,
   d. a dual cylinder member having
   e. a first cylinder and
   f. a second cylinder
   g. single means mounting first and second pistons in said first and second cylinders, respectively,
   h. means mounting said dual cylinder member between said opposed friction surfaces of said opposed members,
   i. means mounting said mounting means for said dual cylinder member rotatably on said hub,
   j. means for mounting a fan on said mounting means, and
   k. means for supplying fluid pressure at a point between said first and second pistons to move the same into contact with said opposed friction surfaces of said opposed members whereby said fan mount rotates with said sheave,
   l. said opposed members including an annular mount having a flat ring, and
   m. a radially disposed flange carried thereby, said single means mounting the pistons in the cylinders including
   n. a central wall separating said first and second cylinders,
   o. a multiplicity of spaced pins mounted in said central wall,
   p. each of said first and second pistons having a multiplicity of sockets in which said pins are slidably mounted.

2. The device of claim 1 in which said means mounting said cylinder member between said opposed friction surfaces of said opposed members includes
   a. an annular extension formed on said cylinder member and secured to
   b. an annular fan mount.

3. The device of claim 2 in which said means for mounting a fan on said mounting means includes bolt means.

4. The device of claim 2 in which said means mounting said mounting means for said cylinder member rotatably includes
   a. bearing means carried by said annular fan mount and said hub.

5. An internal caliper fluid operated clutch comprising:
   a. a hub,
   b. a sheave mounted rotatably on said hub,
   c. opposed members forming friction surfaces connected to said sheave,
   d. a dual cylinder member having
   e. a first cylinder and
   f. a second cylinder
   g. single means mounting first and second pistons in said first and second cylinders, respectively,
   h. means mounting said dual cylinder member between said opposed friction surfaces of said opposed members,
   i. means mounting said mounting means for said dual cylinder member rotatably on said hub,
   j. means for mounting a fan on said mounting means, and
   k. means for supplying fluid pressure at a point between said first and second pistons to move the same into contact with said opposed friction surfaces of said opposed members whereby said fan mount rotates with said sheave, said single means mounting the pistons in the cylinders including
   l. a central wall separating said first and second cylinders,
   m. a multiplicity of spaced pins mounted in said central wall,
   n. each of said first and second pistons having a multiplicity of sockets in which said pins are slidably mounted.

* * * * *